US012603406B2

(12) United States Patent
Denis et al.

(10) Patent No.: US 12,603,406 B2
(45) Date of Patent: Apr. 14, 2026

(54) MICROWAVE-FREQUENCY POWER TRANSMISSION WINDOW ASSEMBLY INCLUDING TUBES HAVING AN OBLIQUE PLANAR CROSS SECTION FOR SUPPORTING AN OPTICAL PLATE THEREBETWEEN

(71) Applicant: THALES, Meudon (FR)

(72) Inventors: Philippe Denis, Velizy Villacoublay (FR); Yann Mathe, Velizy Villacoublay (FR)

(73) Assignee: THALES, Meudon (FR)

( * ) Notice: Subject to any disclaimer, the term of this patent is extended or adjusted under 35 U.S.C. 154(b) by 156 days.

(21) Appl. No.: 18/385,298

(22) Filed: Oct. 30, 2023

(65) Prior Publication Data

US 2024/0154291 A1 May 9, 2024

(30) Foreign Application Priority Data

Nov. 9, 2022 (FR) .................................... 2211663

(51) Int. Cl.
*H01P 1/08* (2006.01)
*H01P 5/02* (2006.01)
*H01P 5/08* (2006.01)

(52) U.S. Cl.
CPC .................. *H01P 1/08* (2013.01); *H01P 5/02* (2013.01); *H01P 5/082* (2013.01)

(58) Field of Classification Search
CPC .................................................. H01P 1/08
USPC .................................................. 333/252
See application file for complete search history.

(56) References Cited

U.S. PATENT DOCUMENTS 2,637,776 A * 5/1953 Edson .................... H01P 1/08 333/252
2,706,275 A * 4/1955 Clark, Jr. ................ H01P 1/08 333/252
2,894,228 A * 7/1959 Geisler, Jr. .............. H01P 1/08 333/252
3,098,207 A * 7/1963 Gordon et al. ........... H01P 1/08 315/39
3,210,699 A * 10/1965 Tagano .................. H01P 1/08 333/252
3,555,450 A 1/1971 Rockwell

FOREIGN PATENT DOCUMENTS

GB 857 331 A 12/1960

* cited by examiner

*Primary Examiner* — Benny T Lee
(74) *Attorney, Agent, or Firm* — BakerHostetler

(57) ABSTRACT

A microwave-frequency power-transmission window assembly includes a microwave-frequency power-transmission window comprising: two tubes each having two parallel oblique planar cross sections, one oblique planar cross section being non-perpendicular to the central axis of the tube and being of constant thickness in the oblique planar cross section; and an optical plate assembled between the two respective ends of the two tubes positioned facing one another; a tubular extension element extending the microwave-frequency power-transmission window; two centring rings that centre the microwave-frequency power-transmission window in the tubular extension element; and an external housing equipped with two transparent portions positioned at the ends of the microwave-frequency power-transmission window tubular extension element.

3 Claims, 5 Drawing Sheets

MICROWAVE-FREQUENCY POWER TRANSMISSION WINDOW ASSEMBLY INCLUDING TUBES HAVING AN OBLIQUE PLANAR CROSS SECTION FOR SUPPORTING AN OPTICAL PLATE THEREBETWEEN

CROSS-REFERENCE TO RELATED APPLICATION

This application claims priority to foreign French patent application No. FR 2211663, filed on Nov. 9, 2022, the disclosure of which is incorporated by reference in its entirety.

FIELD OF THE INVENTION

The invention relates to a tube having at least one end of oblique planar cross section.

BACKGROUND

When a tube of constant thickness is cut at an oblique angle, i.e. when the obliquely-cut end has an oblique planar cross section not perpendicular to the central axis, its thickness is not constant, as depicted in FIG. 1.

Specifically, because the cut is oblique, the thickness of the cut end is not constant, as depicted in FIG. 1, which figure shows the variation in the thickness which, for example, adopts several values, the extreme values of which are indicated as $e_1$ and $e_2$.

Assembling such an end of tube onto a planar surface made from a different material, or onto another tube having a corresponding oblique cut (where the angles at which the tubes are cut relative to the axis complement one another), leads to asymmetry which has the effect that, upwards of a diameter of 30 mm, the stresses associated with the difference in expansion and the necks or brazed joints that are very thick in places lead to catastrophic failure of the assembly.

SUMMARY OF THE INVENTION

One objective of the invention is to alleviate the above-mentioned problems.

One aspect of the invention proposes a microwave-frequency power-transmission window assembly comprising:

- a microwave-frequency power-transmission window comprising:
  - two tubes each having two parallel oblique planar cross sections, one oblique planar cross section being non-perpendicular to the central axis of the tube and being of constant thickness in the oblique planar cross section; and
  - an optical plate assembled between the respective ends of the two tubes positioned facing one another;
- an extension tube;
- two centering rings that center the microwave-frequency power-transmission window in the extension tube; and
- an external housing equipped with two transparent portions positioned at the ends of the extension tube.

According to one embodiment, the optical plate is made of diamond or of quartz or of sapphire or of glass.

In one embodiment, the microwave-frequency power-transmission window is a so-called "Brewster" window in which the oblique planar cross section is such that the angle between the central axis of the tube and a normal to the oblique planar cross section is 67.22°.

BRIEF DESCRIPTION OF THE DRAWINGS

The invention will be better understood based on studying a few embodiments that are described by way of entirely non-limiting examples and illustrated by the appended drawings, in which.

Throughout the detailed description of the figures, similar elements have identical references are similar.

DETAILED DESCRIPTION OF THE INVENTION

Figure 1:
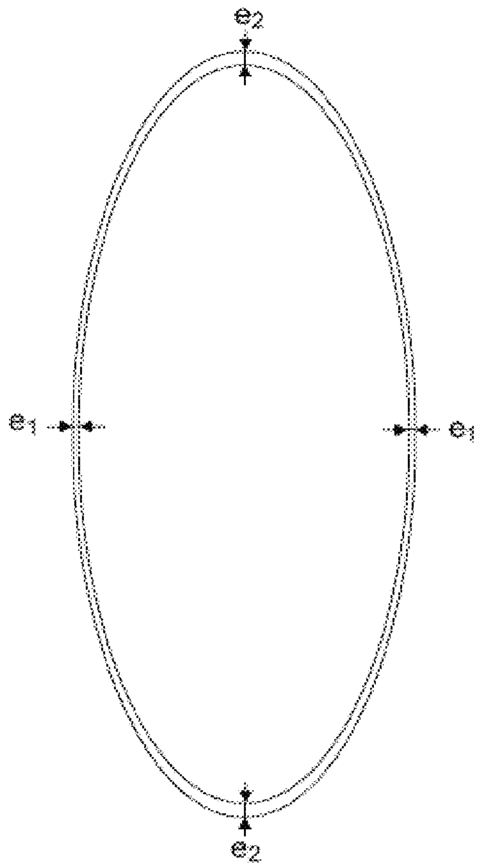
PRIOR ART FIG. 1
FIG. 1 schematically illustrates a tube, of constant thickness, cut at an oblique angle, according to the prior art.
Figure 2:
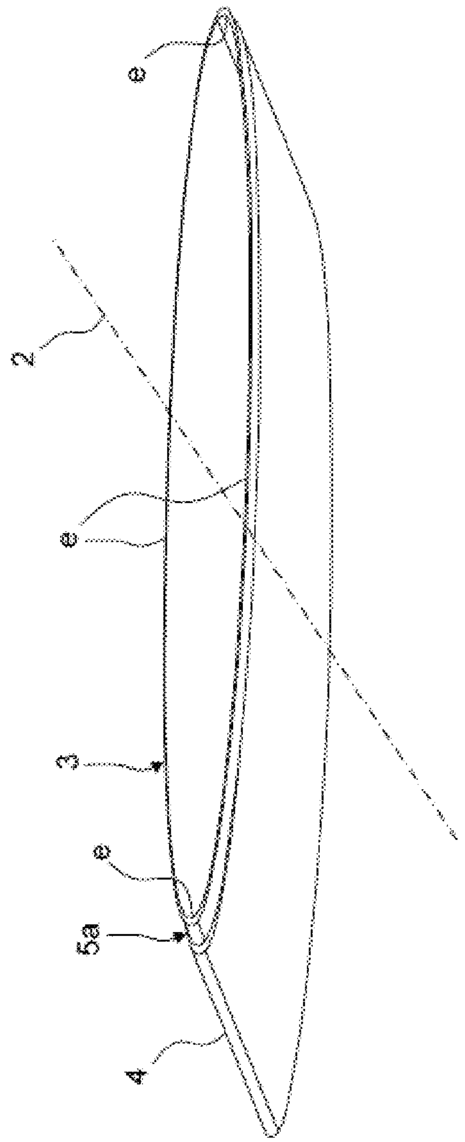
FIG. 2 schematically illustrates a tube having an end with a planar cross section and a constant thickness according to one aspect of the invention.

FIG. 2 schematically illustrates a tube 4 having an end 3 with a planar cross section and a constant thickness e according to one aspect of the invention.

The constant thickness e can be obtained by a machining operation 5*a*.

Because of this angle, in the absence of such machining, the oblique ends have a non-constant dimension and in particular have an oblong shape and a non-constant wall thickness, the wall thickening from the centre towards the end of each longest side.

What is meant by "oblique" is a planar cutting angle that forms an angle that is not perpendicular to the axis 2 of the tube 4.

The effect of this asymmetry is that upwards of a diameter of 30 mm, the stresses associated with the difference in expansion of the tube and the oblique ends that are very thick in places lead to failure of an assembly with a plate or a tube made of another material.

It is an object of the present invention to perform mechanical machining to make it possible to create a thickness e that is constant all around the circumference of the oblique cut, irrespective of the angle of the oblique cut, over a height that is sufficient to minimize loadings caused by thermal-mechanical stresses.

Figure 3:
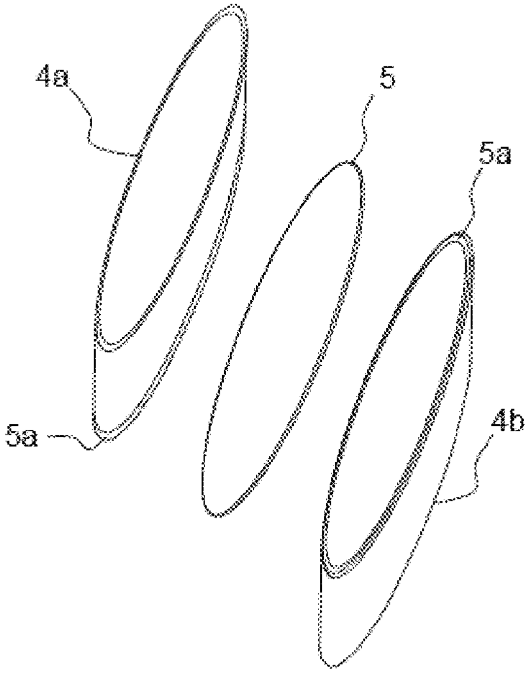
FIG. 3 schematically illustrates a microwave-frequency power-transmission window according to one aspect of the invention.

Assembly may be achieved using brazing, welding, adhesive bonding, etc. FIG. 3 schematically depicts a microwave-frequency power-transmission window comprising an assembly comprising:

- two tubes 4*a*, 4*b*, each having two parallel ends of constant thickness and of oblique planar cross sections; and
- an optical plate 5 assembled between the two respective ends of the two tubes 4*a*, 4*b* positioned facing one another.

Specifically, the present invention is particularly applicable to microwave-frequency power-transmission windows for electron tubes. The power-transmission windows need to be capable of transmitting the energy supplied by the microwave tube, while at the same time minimizing losses caused by the intrinsic properties of the material and the microwave frequency matching, while at the same time maintaining ultrahigh vacuum sealing. The microwave frequency matching is performed on a particular frequency or on a frequency band.

In certain cases it is necessary to have near-perfect matching not on one frequency band but on two or more particular frequencies. This is notably the case with the use of a tube of the dual-frequency gyrotron type which delivers very high powers of the order of a megawatt at very high frequencies in excess of 100 GHz. In such cases it is necessary to use a window, the principle of which is that it is, by design, suitable for all frequencies.

Figure 4:
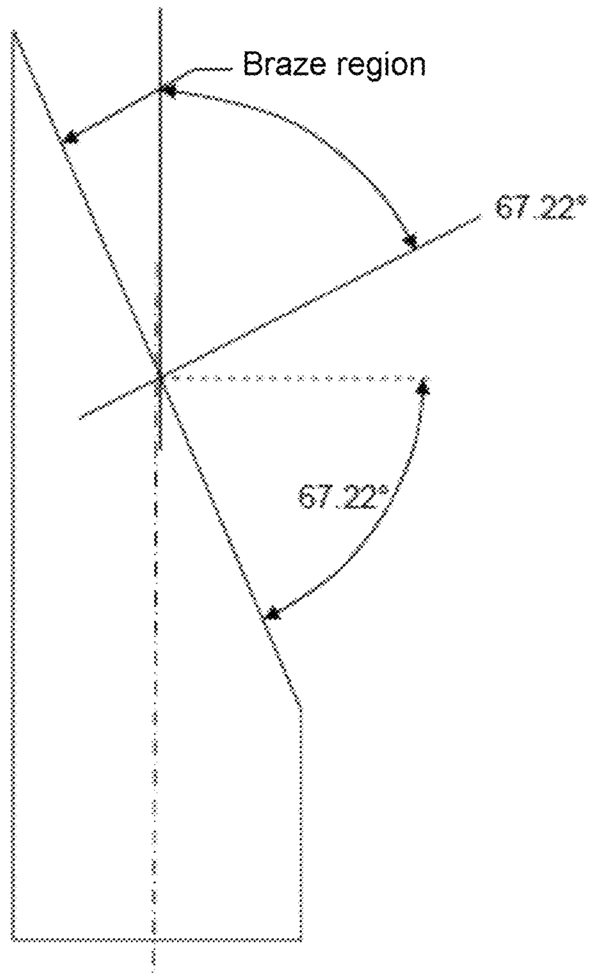
FIG. 4 schematically illustrates a microwave-frequency power-transmission window of FIG. 3 in the case of a so-called "Brewster" window, according to another aspect of the invention.

This then is a window known as a "Brewster" window, as illustrated in FIG. 4, the main property of which is that it uses a plate, for example made of diamond, inclined by a so-called "Brewster" angle which is exactly 67.22° in the case of a plate made of diamond. In order to create a window of this type it is therefore necessary to produce a tube and place it on each side of the plate positioned at the appropriate angle so as to create a sealed assembly which in all respects conforms to the conditions of operation of the power window on the electron tube in order to ensure the sealing thereof.

Large sized windows of this type for mounting on a tube do not exist. There are a huge number of ways of assembling ceramics for example onto copper skirts in order to ensure microwave-frequency and sealing properties.

Because of the 67.22° "Brewster" angle, in embodiments of the prior art, the ends of oblique planar cross section not perpendicular to the central axis of the tube do not have a constant dimension and in particular have an oblong shape. The resulting wall thickness is not constant, the wall becoming thicker from the center of the tube towards the end of each longest side. The effect of this asymmetry is that upwards of a diameter of 30 mm, the stresses associated with the difference in expansion and the ends that are very thick in places lead to catastrophic failure of the assembly.

What is needed is the creation of an assembly that is sealed and resistant to the various heat cycles. The basic concept is to assemble, for example by brazing, a wall made of a dielectric material such as diamond, onto ends made of copper which are positioned one on each side of the microwave-frequency transmission wall, and to take steps to ensure that the assembly is sealed.

The present invention makes it possible to perform a mechanical machining operation enabling the creation of a constant thickness along the entire brazed length, irrespective of the angle to ensure flexibility and thus minimize the loadings caused by the thermal-mechanical stresses during the assembly and baking operations.

In order to be able to achieve this assembly under the best possible conditions given the "Brewster" angle, as illustrated in FIG. 4, the wall is brazed flat (i.e., "Braze region") as in the case of conventional cylindrical windows and so as to create the tooling necessary for performing this operation without installing complicated tooling for positioning the transmission plate with respect to the oblique ends. A second brazing operation allows this first step to be assembled with the rest of the assembly to constitute a window assembly capable of being assembled on the tube concerned.

Figure 5:
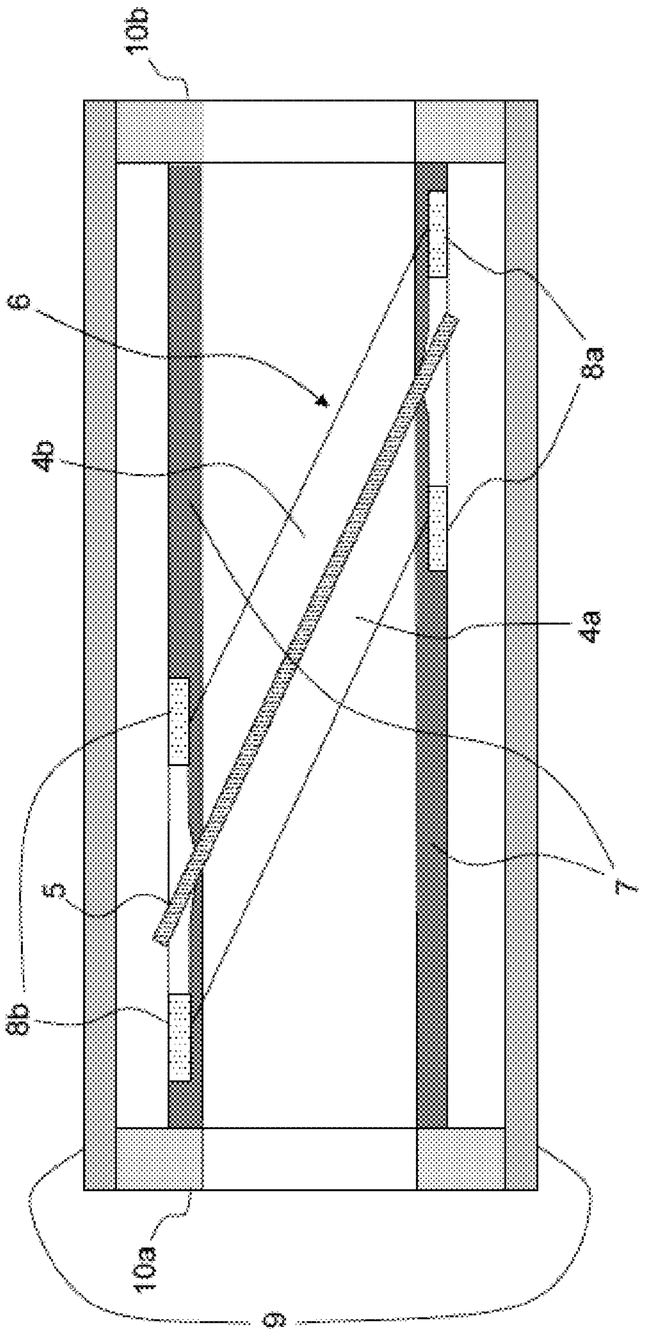
FIG. 5 schematically illustrates a microwave-frequency power-transmission window according to another aspect of the invention.

A window assembly is depicted schematically in FIG. 5, this assembly comprising:

- a microwave-frequency power-transmission window 6 according to FIG. 2;
- a tubular extension element 7 for extending the microwave-frequency power-transmission window;
- two centering rings 8*a*, 8*b* that center the microwave-frequency power-transmission window 6 in the tubular extension element 7; and
- an external housing 9 equipped with two transparent portions 10*a*, 10*b* positioned at the ends of the microwave-frequency power-transmission window tubular extension element 7.

For example, given the ratio between the dimensions of the true diameter and the apparent dimensions resulting from the "Brewster" angle, these dimensions being in a ratio of 2.5, it is necessary to perform a machining operation able to reduce the brazing land to an annulus 1 mm in width, while at the same time giving the tubes 4*a*, 4*b* flexibility without reducing the thickness of the tubes 4*a*, 4*b* excessively, as this would lead to risks of permeation, deformation and, more generally, defective sealing.

For example, given the ratio between the dimensions of the true diameter and the apparent dimensions resulting from the "Brewster" angle, these being in a ratio of 2.5, it is necessary to perform a machining operation able to reduce the brazing land to an annulus 1 mm in width, while at the same time giving the tubes 4*a*, 4*b* flexibility without reducing the thickness of the tubes 4*a*, 4*b* excessively, as this would lead to risks of permeation, deformation and, more generally, defective sealing.

This machining operation involves creating of flexibility at that end of the assembly 6 that is connected to the material that allows the transmission of the microwave energy, so as to reduce the stresses caused by the differential expansion between the various materials and also connected with the "Brewster" angle which leads to a ratio of 2.5 between the wall thickness at the diameter perpendicular to the cut, which corresponds to the true diameter of the tube, and the wall thickness at the cutting plane which is situated on the major diameter of the ellipse.

In order to alleviate this disadvantage, this width is reduced by a machining operation on the periphery of the tubes at the places at which the thickness becomes greater than the desired thickness.

The invention claimed is:

1. A microwave-frequency power-transmission window assembly comprising:

- a microwave-frequency power-transmission window comprising:
  - two tubes each having two parallel oblique planar cross sections, at least one of the two parallel oblique planar cross sections being non-perpendicular to a central axis of the respective tube and being of constant thickness in the oblique planar cross section thereof;
- and
  - an optical plate assembled between the respective ends of the two tubes positioned facing one another;
- an extension tube for extending the microwave-frequency power-transmission window;
- two centering rings that center the microwave-frequency power-transmission window in the extension tube; and
- an external housing equipped with two transparent portions positioned at the ends of the extension tube.

2. The microwave-frequency power-transmission window assembly according to claim 1, wherein the optical plate is made of diamond or of quartz or of sapphire or of glass.

3. The microwave-frequency power-transmission window assembly according to claim 1, wherein the microwave-frequency power-transmission window is a Brewster window in which the oblique planar cross section is such that the angle between the central axis of the respective tube and a normal to the oblique planar cross section is 67.22°.

* * * * *